United States Patent
Alpert et al.

(10) Patent No.: US 11,301,757 B2
(45) Date of Patent: *Apr. 12, 2022

(54) FAULT-TOLERANT POWER-DRIVEN SYNTHESIS

(71) Applicant: INTERNATIONAL BUSINESS MACHINES CORPORATION, Armonk, NY (US)

(72) Inventors: Charles J. Alpert, Austin, TX (US); Pallab Datta, San Jose, CA (US); Myron D. Flickner, San Jose, CA (US); Zhou Li, Austin, TX (US); Dharmendra S. Modha, San Jose, CA (US); Gi-Joon Nam, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 171 days.

This patent is subject to a terminal disclaimer.

(21) Appl. No.: 16/696,968

(22) Filed: Nov. 26, 2019

(65) Prior Publication Data

US 2020/0097833 A1 Mar. 26, 2020

Related U.S. Application Data

(63) Continuation of application No. 14/537,844, filed on Nov. 10, 2014, now Pat. No. 10,552,740.

(51) Int. Cl.
*G06N 3/10* (2006.01)

(52) U.S. Cl.
CPC .................................. *G06N 3/10* (2013.01)

(58) Field of Classification Search
CPC ....................................................... G06N 3/10
See application file for complete search history.

(56) References Cited

U.S. PATENT DOCUMENTS

| 7,549,081 B2 | 6/2009 | Robbins et al. |
| 8,515,885 B2 | 8/2013 | Modha |
| 2006/0031802 A1 | 2/2006 | Alpert et al. |

(Continued)

OTHER PUBLICATIONS

Gizopoulos, D., Psarakis, M., Adve, S.V., Ramachandran, P., Hari, S.K.S., Sorin, D., Meixner, A., Biswas, A. and Vera, X., Mar. 2011. Architectures for online error detection and recovery in multicore processors. In 2011 Design, Automation & Test in Europe (pp. 1-6). IEEE. (Year: 2011).*

(Continued)

*Primary Examiner* — Chuen-Meei Gan
(74) *Attorney, Agent, or Firm* — Erik A. Huestis; Stephen J. Kenny; Foley Hoag, LLP

(57) ABSTRACT

Embodiments of the present invention relate to providing fault-tolerant power minimization in a multi-core neurosynaptic network. In one embodiment of the present invention, a method of and computer program product for fault-tolerant power-driven synthesis is provided. Power consumption of a neurosynaptic network is modeled as wire length. The neurosynaptic network comprises a plurality of neurosynaptic cores connected by a plurality of routers. At least one faulty core of the plurality of neurosynaptic cores is located. A placement blockage is modeled at the location of the at least one faulty core. A placement of the neurosynaptic cores is determined by minimizing the wire length.

18 Claims, 15 Drawing Sheets

(56) References Cited

U.S. PATENT DOCUMENTS

| | | | |
|---|---|---|---|
| 2006/0031804 A1 | 2/2006 | Alpert et al. | |
| 2007/0271543 A1 | 11/2007 | Alpert et al. | |
| 2008/0066037 A1 | 3/2008 | Alpert et al. | |
| 2008/0127017 A1 | 5/2008 | Alpert et al. | |
| 2008/0127018 A1 | 5/2008 | Alpert et al. | |
| 2008/0148203 A1 | 6/2008 | Alpert et al. | |
| 2008/0282213 A1 | 11/2008 | Alpert et al. | |
| 2011/0004579 A1 | 1/2011 | Snider | |
| 2012/0136633 A1 | 5/2012 | Xu | |
| 2012/0174052 A1 | 7/2012 | Mathur | |
| 2012/0259804 A1* | 10/2012 | Brezzo | G06N 3/063 706/25 |
| 2013/0031039 A1* | 1/2013 | Sim | G06N 3/049 706/26 |
| 2013/0073497 A1* | 3/2013 | Akopyan | G06N 3/049 706/27 |
| 2013/0073498 A1* | 3/2013 | Izhikevich | G06N 3/049 706/27 |
| 2013/0086544 A1 | 4/2013 | Alpert et al. | |
| 2013/0086545 A1 | 4/2013 | Alpert et al. | |
| 2013/0198121 A1 | 8/2013 | Modha et al. | |
| 2014/0095923 A1 | 4/2014 | Alvarez-Icaza Rivera et al. | |
| 2014/0115298 A1 | 4/2014 | Philip et al. | |

OTHER PUBLICATIONS

Chang, K.C., Shen, J.S. and Chen, T.F., Aug. 2005. A low-power crossroad switch architecture and its core placement for network-on-chip. In Proceedings of the 2005 international symposium on Low power electronics and design (pp. 375-380). (Year: 2005).*

Patterson, C., Garside, J., Painkras, E., Temple, S., Plana, L.A., Navaridas, J., Sharp, T. and Furber, S., 2012. Scalable communications for a million-core neural processing architecture. Journal of Parallel and Distributed Computing, 72(11), pp. 1507-1520. (Year: 2012).*

Amir et al., "Cognitive Computing Programming Paradigm: A Corelet Language for 1 Composing Networks of Neurosynaptic Cores," IBM Research, available at :https://dl.dropboxusercontent.com/; u/91714474/Papers/020. IJCNN2013.Corelet.pdf : See sections IA, IC, IIA, IIB, IIIA, IIIB, IIIC & IIID (2013).

Cassidy et al., "Cognitive computing building block: a versatile and efficient digital neuron model for neurosynaptic cores," IJCNN, pp. 1-10 (2013).

Chang et al., "A low-power crossroad switch architecture and its core placement for network-on-chip," ACM, pp. 375-380 (2005).

Datta et al. "Power Driven Synapse Network Synthesis—Mapping from Software to Hardware," IBM Corporation (2007).

Esser et al., "Cognitive Computing Systems: Algorithms and 3 Applications for Networks of Neurosynaptic Cores," IBM Research, pp. 1-10. Retrieved from: https: / /dl.dropboxusercontent.com/u/ 91714474/Papers/021.IJCNN2013. Applications.pdf: See sections IA, IC, 2B, IIIA (2013).

Gizopolous et al., "Architectures for Online Error Detection and Recovery in Multicore Processors," Design Automation & Test in Europe (2011).

Khorwal et al., "Floorplanning: concept, challenges and closure," EON network, pp. 1-9 (2012).

Mitra et al., "Real-Time Classification of Complex Patterns Using Spike-Based Learning in 4 Neuromorphic VLSI," IEEE Transactions on Biomedical Circuits and Systems, 3(1), 32-42. Doi: 10.1109/; TBCAS.2008.2005781: See sections IC & II (2009).

Paterson et al., "Scalable communications for a million-core neural processing architecture," Journal of Parallel and Distributed Computing, 72(11): 1507-1520 (2012).

Prodromou et al., "NoCAlert: An On-Line and Real-Time Fault Detection Mechanism for Network-on-Chip Architectures," 45th Annual IEEE/ACM International Symposium on Microarchitecture, pp. 60-71 (2012).

Srinivasa et al., "Self-organizing spiking neural model for learning fault-tolerant spatial-motor transformations," IEEE Transactions on neural networks and learning systems, 23(10): 1526-1538 (2012).

Stromatias et al., "Power analysis of large-scale, real-time neural networks on SpiNNaker," The 2013 International Joint Conference on Neural Networks, 1-8 (2013).

Villarrubia, "CPLACE: A Standard Cell Placement Program," IBM, (2005).

Vygen, "Combination optimization in VLSI placement and routing," University of Bonn, pp. 1-206 (2012).

Zhang et al., ""A reconfigurable routing algorithm for a fault-tolerant 2D-Mesh Network-on-Chip,"" The 45th annual Design Automation Conference (DAC), pp. 441-446 (2008).

* cited by examiner

FAULT-TOLERANT POWER-DRIVEN SYNTHESIS

CROSS-REFERENCE TO RELATED APPLICATIONS

This application is a continuation of U.S. application Ser. No. 14/537,844, filed Nov. 10, 2014, which is hereby incorporated by reference in its entirety.

STATEMENT REGARDING FEDERALLY SPONSORED RESEARCH OR DEVELOPMENT

This invention was made with Government support under contract number HR0011-09-C-0002 awarded by the Defense Advanced Research Projects Agency (DARPA). The Government has certain rights to this invention.

BACKGROUND

Embodiments of the present invention relate to power-driven synaptic network synthesis, and more specifically, to providing fault-tolerant power minimization in a multi-core neurosynaptic network.

BRIEF SUMMARY

According to one embodiment of the present invention, a method of and computer program product for power-driven neurosynaptic network synthesis are provided. Power consumption of a neurosynaptic network is modeled as wire length. The neurosynaptic network comprises a plurality of neurosynaptic cores connected by a plurality of routers. At least one faulty core of the plurality of neurosynaptic cores is located. A placement blockage is modeled at the location of the at least one faulty core. A placement of the neurosynaptic cores is determined by minimizing the wire length.

According to another embodiment of the present invention, a method of and computer program product for power-driven neurosynaptic network synthesis are provided. Power consumption of a neurosynaptic network is modeled as wire length. The neurosynaptic network comprises a plurality of neurosynaptic cores connected by a plurality of routers. At least one faulty router of the plurality of routers is located. A placement blockage is modeled. The placement blockage includes at least a core of the plurality of cores associated with the faulty router. A placement of the neurosynaptic cores is determined by minimizing the wire length.

DETAILED DESCRIPTION

Figure 1:
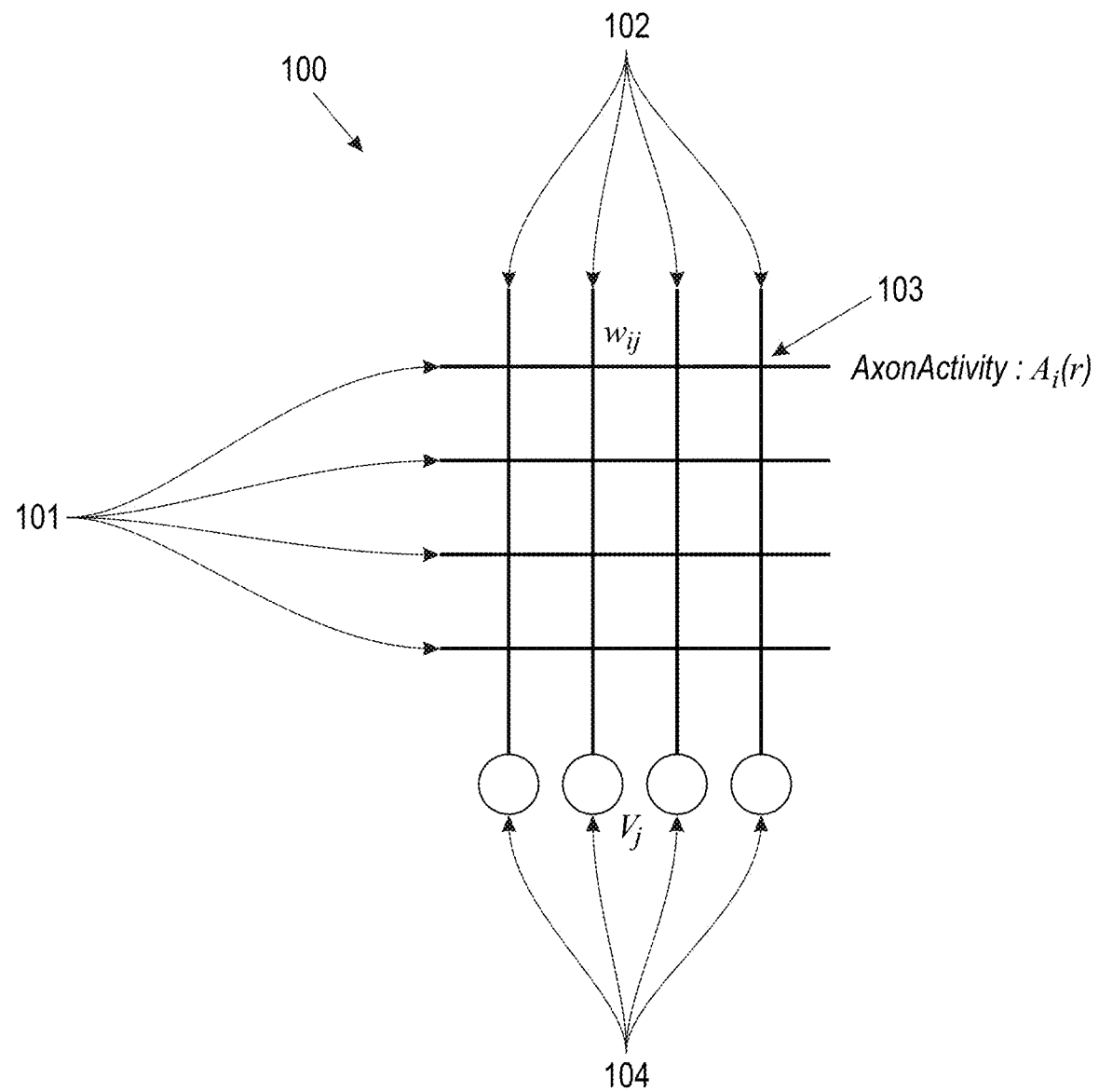
FIG. 1 depicts a neurosynaptic core according to embodiments of the present disclosure.

Power consumption and heat dissipation are major barriers to exascale computing. Arrays of extremely low power neurosynaptic processing units, called neurosynaptic cores, provide an architecture to solve exascale big data problems. These cores use spikes to encode information. While these neurosynaptic networks may be low power, significantly lower power can be achieved by rearranging the network to minimize the power cost of communication. In normal spike traffic, rearrangement according to embodiments of the present disclose does not alter program semantics in any way. The same number of spikes will be created at exactly the same times. Only the internal core arrangement will be different.

According to various embodiments of the present disclosure, a neurosynaptic program represents a neurosynaptic network. A neurosynaptic program includes information relating to the neurosynaptic network. In some embodiments, the information includes neuronal properties and dynamics that determine an electronic neuron's response to input spikes. For example, neuronal properties and dynamics can include a threshold parameter, a leak parameter, a delay parameter, or a reset parameter. In some embodiments, the neurosynaptic program information includes synaptic connections of the neuron (e.g., synaptic connections made via a synaptic crossbar. In some embodiments, the neurosynaptic program information includes axon properties (e.g., axon types). In some embodiments, the neurosynaptic program information includes one or more destinations (e.g., target axons) that the neuron's output spike should be delivered to.

According to various embodiments, a neurosynaptic network represents an instantiation of a neurosynaptic program. A neurosynaptic network may be instantiated in hardware, in simulation or in both. For example, a neurosynaptic program may give rise to one or more instances of a neurosynaptic network, wherein the instances may reside on a single core, multiple cores, or multiple chips.

According to various embodiments, a neuromorphic core circuit represents an example neurosynaptic network described by a neurosynaptic program.

According to various embodiments, a corelet or a Corelet Programming Language represent software that provide abstraction of neurosynaptic programs. A composition of neurosynaptic programs may be created by composing corelets.

A TrueNorth program is a complete specification of a network of neurosynaptic cores, along with its external inputs and outputs. In various embodiments, a divide-and-conquer approach is adopted whereby a large network of neurosynaptic cores is constructed by interconnecting a set of smaller networks of neurosynaptic cores, where each of the smaller networks, in turn, could be constructed by interconnecting a set of even smaller networks, and so on, down to a network consisting of a single neurosynaptic core, which is the fundamental non-divisible building block. This programming paradigm is referred to as Corelet Programming.

In a network of neurosynaptic cores, neurons on each core can connect to any axon of any other neurosynaptic core (including itself). When a neuron spikes, it sends a spike packet that gets delivered to a target axon on a destination core. Given an application and configured neurosynaptic a virtual graph G can be constructed, where every node represents a single core and every edge represents a connection from a set of source neurons on a source core, to a set of destination axons on a target core. The weight of the edge between any two cores represents the total number of spikes communicated between the two cores. Any self-edges (between a neuron and axon on the same core) are ignored. In a physical hardware embodiment of a neurosynaptic system, each core needs to have a unique physical address in a 2D grid on a chip. There can be any number of chips in the system.

A spike communication from a source neuron on a source core, to a target axon on a destination core, would effectively need to traverse certain number of hops via routers in a 2D grid in either the horizontal or vertical or a combination of both to be delivered to the target axon on a destination core. Each hop a spike packet traverses, consumes power and energy. Power Driven Synaptic Network Synthesis according to various embodiments of the disclosure minimize the overall power and energy consumption by producing a physical placement solution of the input application graph G. The optimization problem finds the optimal physical location (dubbed as physical mapping) of every neurosynaptic core on a chip. In some embodiments, it is assumed that the delay constraint for communication through a router between neurosynaptic cores is not an issue. In some embodiments, given up to 16 milliseconds, spikes can be sent through the router without congestion or delay.

The power driven synaptic synthesis problem can be formulated as a VLSI placement problem. According to embodiments of the present disclosure, a VLSI placement is computed to minimizing the total edge lengths of an input neurosynaptic netlist. In this approach, the shorter edge length of two connected cores implies a smaller number of router hops that each spike needs to travel resulting in less power consumption. Thus, by minimizing the total edge lengths of a given neurosynaptic netlist, the total power can be minimized.

In a multi-chip neurosynaptic application, the communication between cores in different chips consumes much higher power compared against one between cores in a same core. In some embodiments of such applications, off-chip communication costs per hop are 100× as compared to on-chip one-hop communication. Placing cores with frequent communications within a chip is a preferred placement solution than one with two cores mapped in different chips. A multilevel partitioning placement algorithm (an MLP) according to various embodiments of the present disclosure solves this problem. In an MLP, the area is partitioned into sub-regions (2 sub-regions for bi-partitioning, k sub-regions for k-way partitioning) and the crossing nets, called "cuts", are minimized among the sub-regions. This process is repeated for each sub-region in a recursive manner until the area of the sub-region becomes small enough that the placement within the area becomes trivial. By minimizing the cuts among sub-regions, it finds the clusters of heavily connected cores and places them within a same chip leading to a better edge-length solution. The process can be iterated several times until no further improvement is made.

In some embodiments, IBM CPLACE may be used as part of a solution to this problem. CPLACE supports different flavors of global placement algorithms including analytical formulations, partitioning-driven placement and some combinations of those. In some embodiments, the multi-level recursive-partitioning algorithm is used. However, in other embodiments, another placement algorithm that minimizes the total wire length can be used to minimize overall power consumption of a given input netlist.

This optimization approach may be applied to various application networks. For example, a) Audio-Video (CUAVE) Fusion Demo (SCS), b) Optical Flow (OF), and c) Edge detection followed by classification (EC). Compared to default sequential placements of cores, CPLACE solutions show active power savings in the range between 30-83%.

As applications are developed using the Corelet Programming language, all neurosynaptic systems are composed hierarchically. Most cores, at the same level of the tree, communicate with each other as systems are built. The Corelet tree structure is extracted from the Corelet Programming Environment and simulated Compass and CPLACE utilize the extracted hierarchical information to improve the quality of a solution. For example, the Corelets that have the same level in the tree may be naturally placed together compared to Corelets that are "siblings" of their parents.

An application in TrueNorth is a network of neurosynaptic cores with its external inputs and outputs defined. Power Driven Synaptic Network Synthesis assigns a physical placement for each core in a neurosynaptic system. However, a chip can have two kinds of fault scenarios:

a. There can be faulty grid locations on a chip(s) where cores cannot be placed.

b. There can be faulty routers, via which spikes can't traverse.

Through fault-tolerant placement according to embodiments of the present disclosure, a placement is realized for every neurosynaptic core such that the overall power and energy consumption is minimized and all fault scenarios are avoided. The fault tolerant physical mapping of cores can be addressed within a placement process as well. As long as the faulty grid locations are provided for the placement optimization, the placer can easily avoid the allocation of cores to faulty grid locations via placement blockage technique. By marking faulty grid locations as blocked area where any core can be placed, no active cores will be physically placed at those locations. The faulty router problem can be addressed in a similar manner. When a routing graph is generated, any path passing through a faulty router is blocked out and no routing solution via faulty router will be generated.

Fault-tolerant placement can be extended to minimize the number of chips as well. For example, the following steps will find a placement solution with minimum power consumption with minimum number of chips.

1. Input: a logical core netlist, the number of cores per chip and faulty location information;
2. Calculate the minimum number of chips required to place the input logical core netlist;
3. Do MLP placement;
4. If a placement is not possible with faulty locations, increase the number of chips by one (note that the newly added chip is assumed with no fault locations);
5. Repeat from step 3.

With reference now to FIG. 1, a neurosynaptic core according to embodiments of the present disclosure is depicted. In some embodiments, neurosynaptic core 100 includes axons 101, represented as rows, dendrites 102, represented as columns, synapses 103, represented as row-column junctions, and neurons 104 that receive inputs from dendrites. In some embodiments, there are 256 synapses, 256 axons, and 256 neurons. In such embodiments, there are 256×256=65,536 synapses. Information flows from axons 101 to the neurons 104, modulated by the synapses 103.

Figure 2:
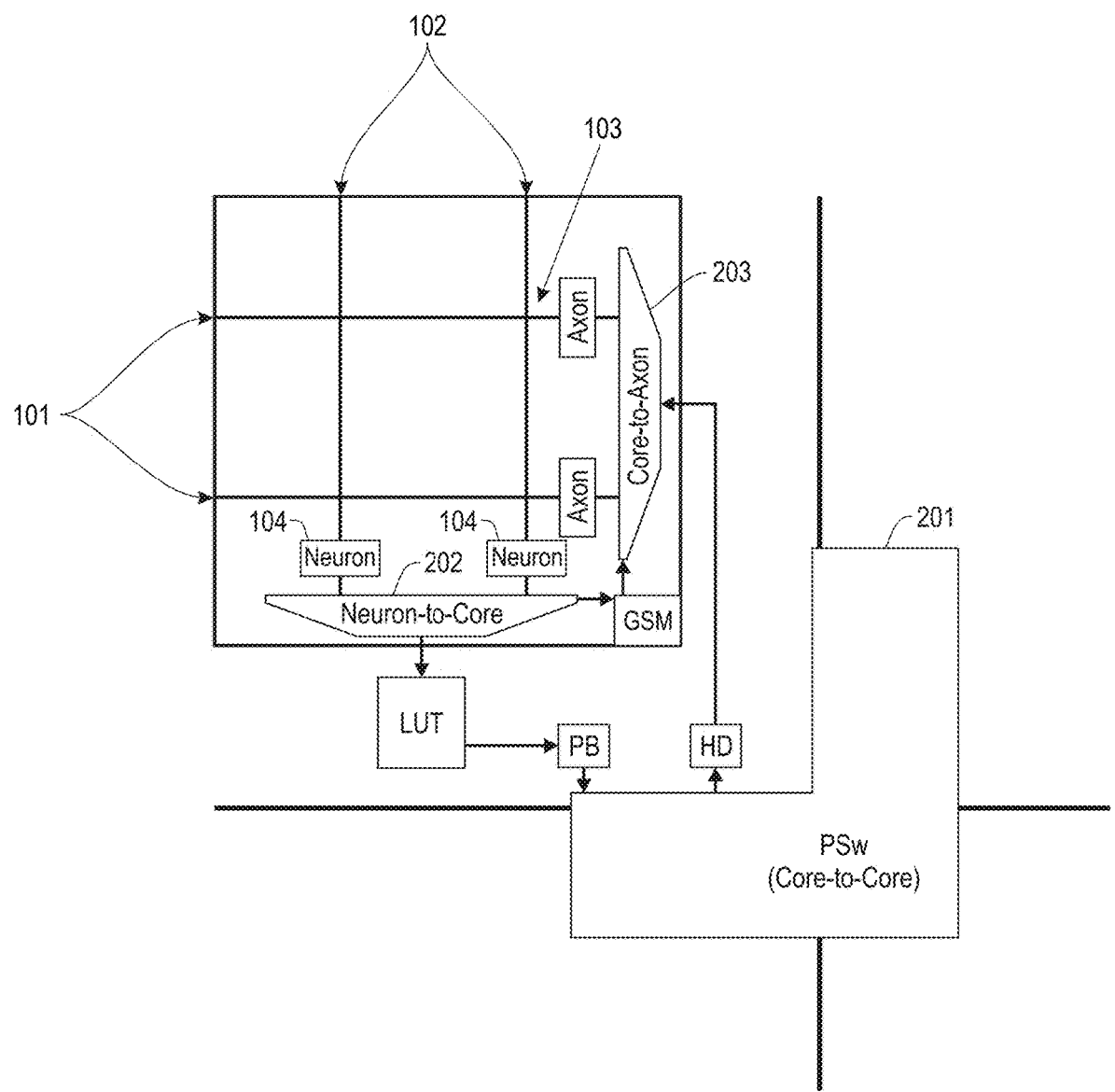
FIG. 2 depicts a neurosynaptic core and mesh router according to embodiments of the present disclosure.

In some embodiments a plurality of neurosynaptic cores are tiled on a chip. In an exemplary embodiments, a 64 by 64 grid of cores is tiled, yielding 4,096 cores, for a total of 1,048,576 neurons and 268,435,456 synapses. In such embodiments, neurons, synapses, and short-distance connectivity are physical. Long-distance connectivity is logical. An exemplary embodiment is depicted in FIG. 2. Mesh router 201 provides communication between cores. Also on a given core, neuron to core 202 and core to axon 203 communication links are provided.

Given an application and the configured neurosynaptic system, there is a virtual graph G=(V,E). In this formulation, V={$v_i$} where $v_i$ represents a single core. In an exemplary embodiment, each chip has 4096 cores comprising a 64 by 64 2D array. Each node can have an out-degree of 256 and in-degree of 256. In this formulation, E={e} where e denotes an edge. Edge e=($v_i$, $v_j$) represents a connection from a set of source neurons on core $v_i$, to a set of destination axons on core $v_j$. N(e) represents the number of source neurons in e. The weight of the edge w(e) is the sum of the firing frequencies of the source neurons. It ranges from 0 to 1000N(e). In one embodiment it is between 0 and 20N(e). In some embodiments, all self-loops are ignored.

Given an application virtual graph G=(V,E) and the edge weighting function, W: E→R, a physical mapping F: V→L is found such that the power P is minimized over all cores. In the physical mapping function F: V→L, L is a pair representation of the physical mapping. For each core $v_i$, $l_i$= ($k_i$,$x_i$,$y_i$), where $k_i$ is the chip index, $x_i$ is the relative horizontal coordinate, and $y_j$ is the relative vertical coordinate. The reference point is the top left corner. Assuming a board with a 2D arrangement of chips, the chip index $k_i$=($r_i$,$c_i$), where $r_i$ is the chip row index, and $c_i$ is the chip column index on a board.

According to the notation used herein, K denotes the number of chips. $E_h$ and $E_v$ are the power consumed for one hop of spike packet sent in the horizontal and vertical distances, respectively. $E_p$ is the power consumed when a spike packet travels across chip boundaries. In some embodiments, $E_p$=(63$E_h$+63$E_v$)*M, since this power is roughly M times more than the power consumed by the intra-chip spike communication. In embodiments with 64 cores per chip, 63 is the maximum number of horizontal and vertical hops within a chip. The horizontal distance of edge e after mapping is given by h(e). For an edge inside the chip, h(e)=|$x_i$−$x_j$|. For an edge across chips, the distance is h(e)=|$x_i$−R($k_i$)|+|$x_j$−L($k_1$)|, where (i<j), R and L are the horizontal boundaries of the chips, and $k_i$ and $k_j$ are the chip indices. The same definition applies to compute V(e).

The inter-chip hop length on a board is $H_p$=|r($k_i$)−r($k_j$)|+ |c($k_i$)−c($k_j$)|. Total power is given by Equation 1.

$$P = \sum_{e \in E} w(e)(E_h h(e) + E_v v(e)) + \sum_{e: k_i \neq k_j} w(e) H_p E_p \quad \text{Equation 1}$$

According to embodiments of the present disclosure, methods and systems for power driven synthesis are provided with respect to logic to physical mapping. In some embodiments, a method is provided to map the power minimization of the spike communication cost problem to the wirelength minimization problem in VLSI Placement. Various exemplary embodiments of the method include one or more of: modeling the power as the wirelength; modeling the spike frequency as the edge weight; modeling the core as a node in the placement graph; modeling the neuron→axon connection as the edge in the placement graph; aggregating all edges between cores as one edge to reduce the graph size; ignoring connections of neuron connecting to the same ores; and using partitioning or another placement algorithm that minimize the weighted wirelength to minimize the power for TrueNorth.

According to embodiments of the present disclosure, the logic to physical mapping problem is transformed into the VLSI placement problem. Multi-level partitioning approaches are then used. As defined above, $E_p$, $E_V$, $E_H$ are parameters and can be fixed with actual hardware measurements. Delay constraints due to the router spike packet delivery across chips are ignored. It can be addressed by adding repeaters after a certain number of chips.

CPLACE is an IBM placer that may be used for many ASIC/Server designs. CPLACE supports many different placement (algorithmic) mode. According to embodiments of the present disclosure, a partitioning-based placement mode is used with CPLACE.

Figure 3:
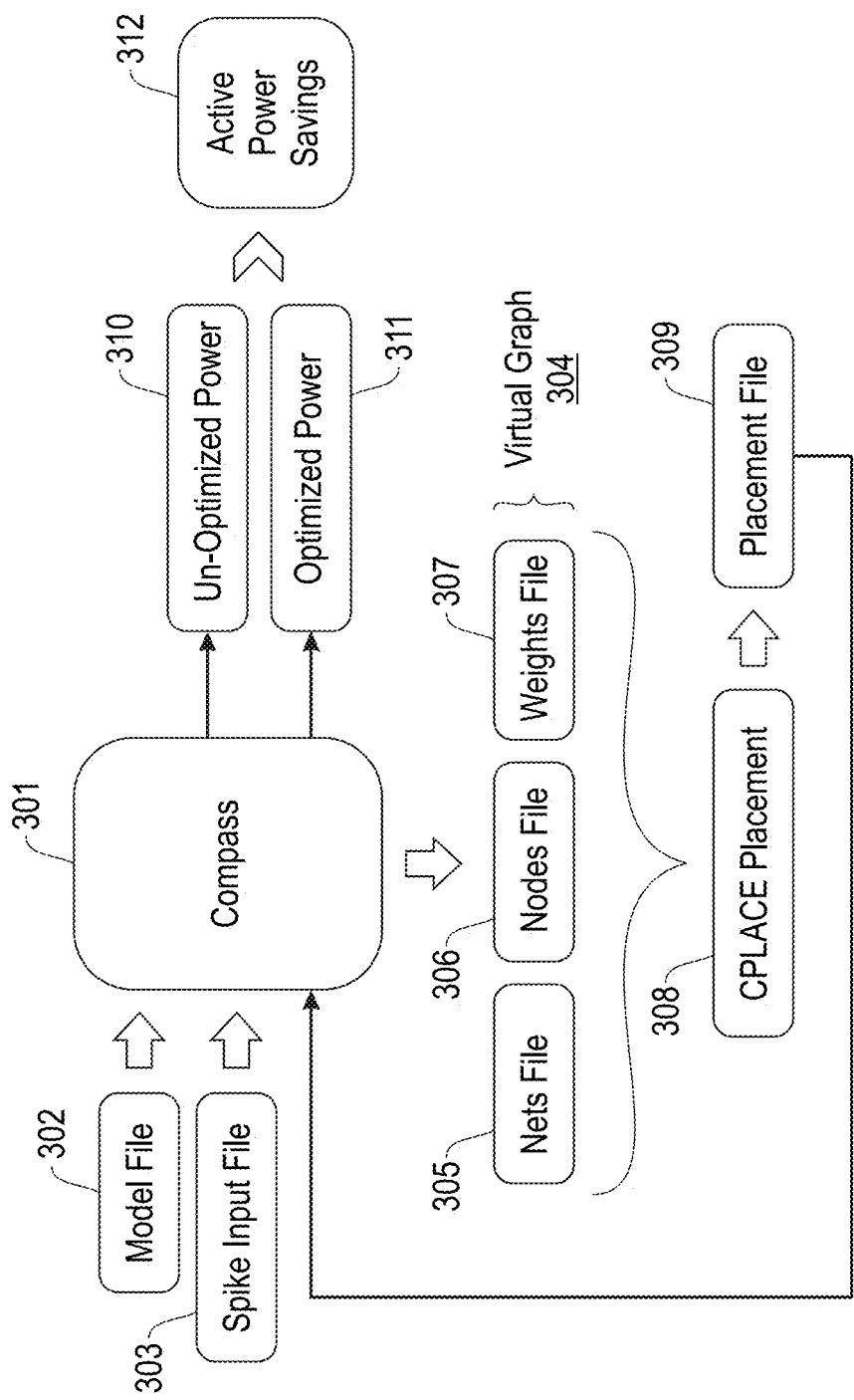
FIG. 3 depicts an exemplary core placement process according to embodiments of the present disclosure.

Referring now to FIG. 3, an exemplary placement process is provided according to embodiments of the present disclosure. The Compass system 301 is responsible for simulating a network of neurosynaptic cores according to the present disclosure. Compass 301 receives a model file 302 and a spike input file 303 to define the simulation. Based on this simulation, a representation of a virtual graph 304 is generated. The virtual graph comprises a nets file 305, a nodes file 306, and a weights file 307 defining the graph 304. The parameters in these files are fed to CPLACE for placement 308. The resulting placement file, 309 is fed back into Compass 301. By running the simulation using the default placement followed by the optimized placement provided by CPLACE, the un-optimized power 310 and optimized power 311 are determined. The result is active power savings 312.

Figure 4A:
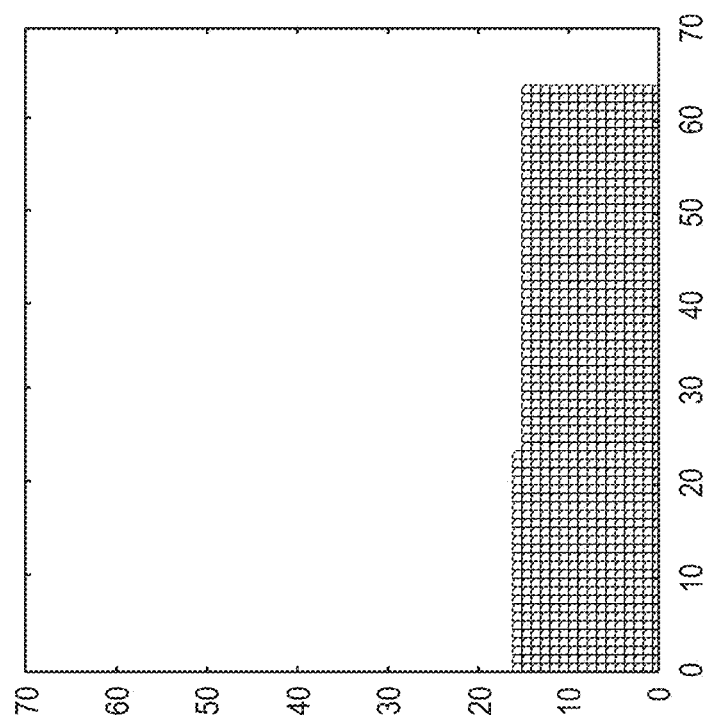
FIGS. 4A-D depict exemplary layouts of neurosynaptic cores according to embodiments of the present disclosure.
Figure 4B:
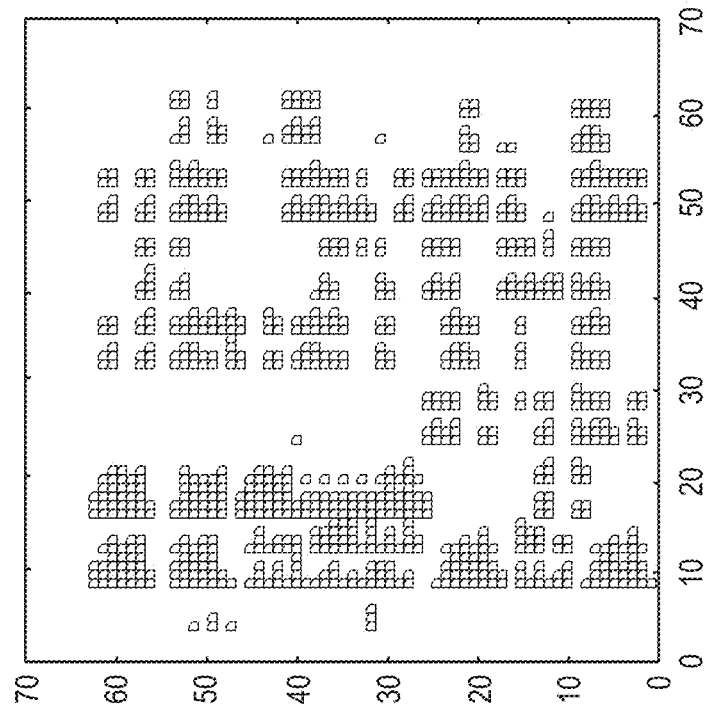
Figure 4D:
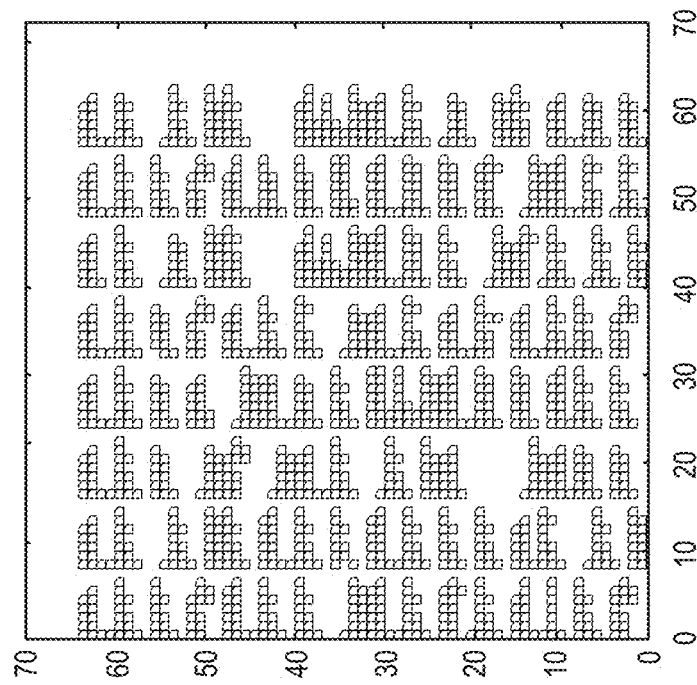
Figure 4C:
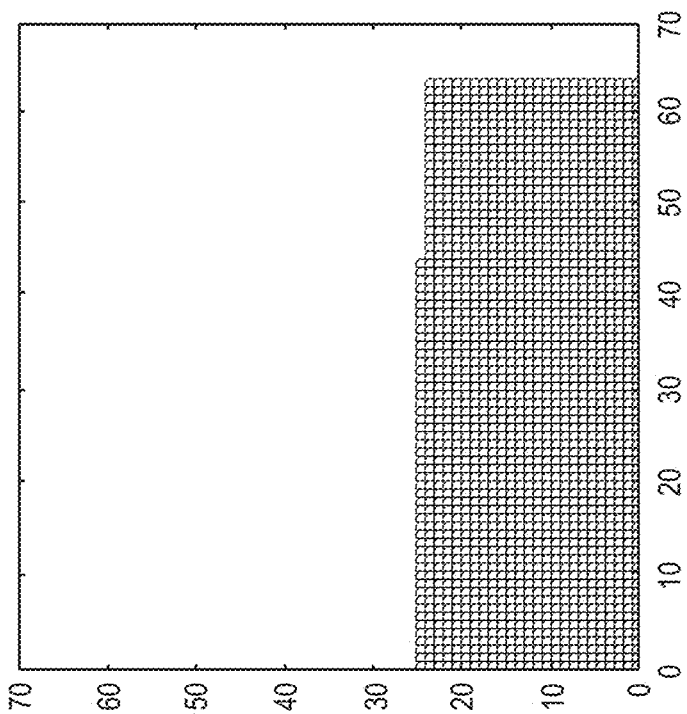

Exemplary test results are depicted below in Table 1. In this table, the CPLACE solution for various use cases is compared to the default solution with actual spiking inputs. In the default solution, all cells are placed in a serial manner based on their index number. Schematic views of physical layouts are provided in FIG. 4. In FIG. 4A, a default layout of a Stackable Classifier System is provided for one chip having 984 cores. In FIG. 4B, the same number of cores is laid out using the CPLACE methods described herein. FIG. 4C depicts a default layout of an Optical Flow using one chip having 1580 cores. In FIG. 4D, the same number of cores is laid out according to the CPLACE methods described herein.

TABLE 1

| Circuits | # Chips/ # Cores | # Nets | # Pins | Active Power Default | Active Power CPLACE |
|---|---|---|---|---|---|
| Stackable Classifier System | 1/984 | 3808 | 7616 | 163.50 mW | 94.83 mW (58.0%) |
| Optical Flow | 1/1580 | 5376 | 10752 | 100.2240 mW | 17.28 mW (82.7%) |
| Edge Classification | 2/7801 | 24960 | 49920 | 218.63 mW | 157.26 mW (30%) |

According to various other embodiments of the present disclosure, power driven synthesis is applied to multi-chip and multi-boards. According to various embodiments, methods and systems are provided for mapping the multi-chips (board level) power minimization as a special placement wirelength minimization problem. In some embodiments, the methods include modeling the I/O constraints at board level as the fixed PI/PO pseudo nets in the placement graph, and translation of the input/output spike frequency as the PI/PO net weight in the placement. In some embodiments, the methods include adding pseudo large blockage to mimic the behavior of across chip transportation power penalty, where the blockage size is proportional to the energy cost between chips. In such embodiments, the whole board is treated as the entire placement image and the placement algorithm is run against it. In some embodiments, the methods include first finding how many chips need to be used for a given number of cores, and enumerating the possible chip configurations (horizontal shape, vertical shape, T shape, L shape, Z shape, W shape, etc.) on a given board layout, and for each configuration, running the placement algorithm to find the best one. In some embodiments, the methods include using Corelet information to pre-partitioning the cores to a set of chips, or run a coarse level (at chip level) partitioning algorithm to find the layout of chips, and then map the cores to each chip. Some embodiments employ multi-level hierarchical clustering optimization.

In certain embodiments of the present disclosure, the placement is directly run for the whole instance. This naturally minimizes the edges across chip since the blockage size is large. In such embodiments, pseudo placement blockages are provided between chips. The size of these blockages is proportional to $E_p^V, E_p^V$, which is the power across the chip boundary. In order to handle board I/O constraints, new pseudo nets are added between I/O ports to cores. This is similar to the constraints from the macro boundary pin and PI/PO in the VLSI placement. In various embodiments, I/O ports are only connected to logic cores. In such embodiments, placement is free to find the best physical mapping of logic core to the physical cores that connect to I/O ports. In alternative embodiments, the mapping for certain number of cores receiving I/O are defined and given as an initial condition to the placement. This is equivalent to fixed cells in the placement.

In some embodiments, chip configurations are enumerated to determine the optimal arrangement. Assuming the application needs K cores, then [K/4096] chips are required. Given a certain board configuration, all possible chip configurations are enumerated, and the placement for each instance is run. This approach guarantees a minimum number of chips, without isolated cores placed outside. Isolated cores may arise if the placement is run for the entire instance as described above. If the board configuration has a small number of chips (e.g., 16, 25, 36), the possible combinations are still constant.

According to various embodiments of the present disclosure, methods and systems for fault-tolerant power minimization given a set of faulty (un-functional) cores and routers is provided.

In some embodiments, the faulty cores and placement blockage are modeled and the instance is passed to a placement algorithm, where the placement minimizes the wirelength without using the bad cores. In cases where there are single or multiple core failures in a chip, re-routing is required to avoid the faulty cores. Placement blockage specification is used to handle core placement. The faulty cores locations are marked as placement blockages. Accordingly, CPLACE won't allocate any cores on those locations.

In some embodiments, only the router portion (only affecting one core) of the chip is modeled as the routing blockage if the router can choose which L shape to send the spike packets. Such embodiments release more cores to be used for the physical mapping than the previously described methods, assuming that the router has more flexibility.

Figure 5:
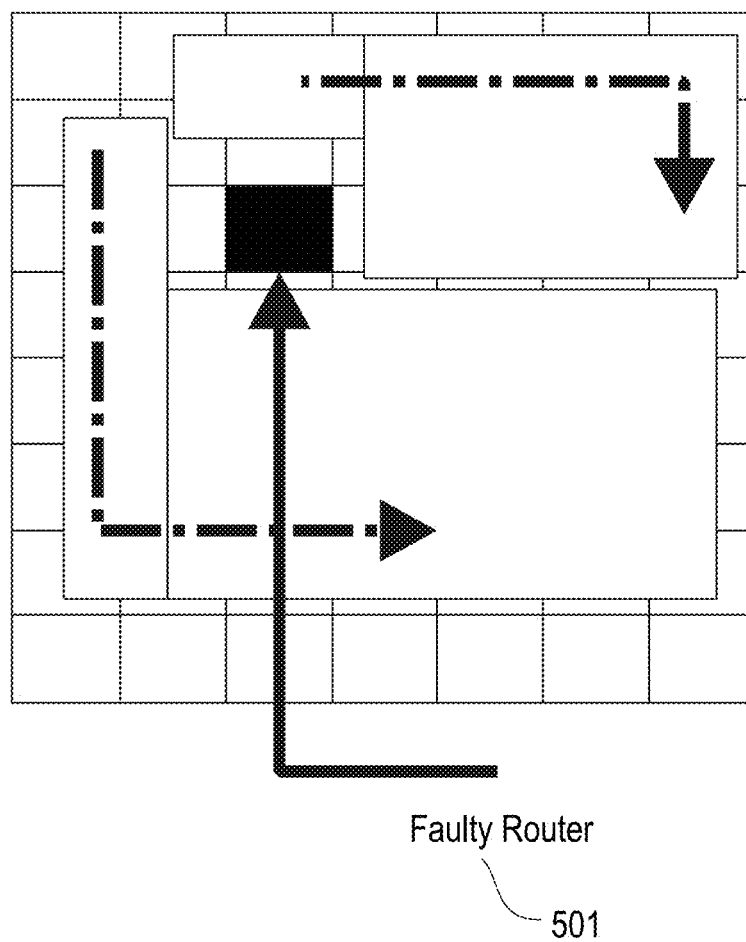
FIG. 5 depicts an exemplary placement of neurosynaptic cores around a faulty router according to embodiments of the present disclosure.

Referring to FIG. 5, an exemplary placement is depicted according to the above approach. Grid 500 includes faulty router 501. Assuming the router has freedom to choose the direction of package switching (horizontal first, or vertical first), then the router location is modeled as the routing blockage. All the cores except the failed router location are then available for mapping.

In some embodiments, a faulty router is modeled by mapping the entire rows and columns occupied by the bad router as placement blockage. In such embodiments, the placement is performed under the new graph instance, such that no cores on those rows/columns are used, which prevents the routing edge passing through the faulty router. In some embodiments, either the row or the column of the faulty router is modeled as routing blockage only. In such embodiments, the use of any cores on those rows/columns is not blocked subject to the fact that the placement will not generate an instance that has edge crossing the faulty router. Such embodiments release more cores to use for the physical mapping than the previously described method.

Figure 6A:
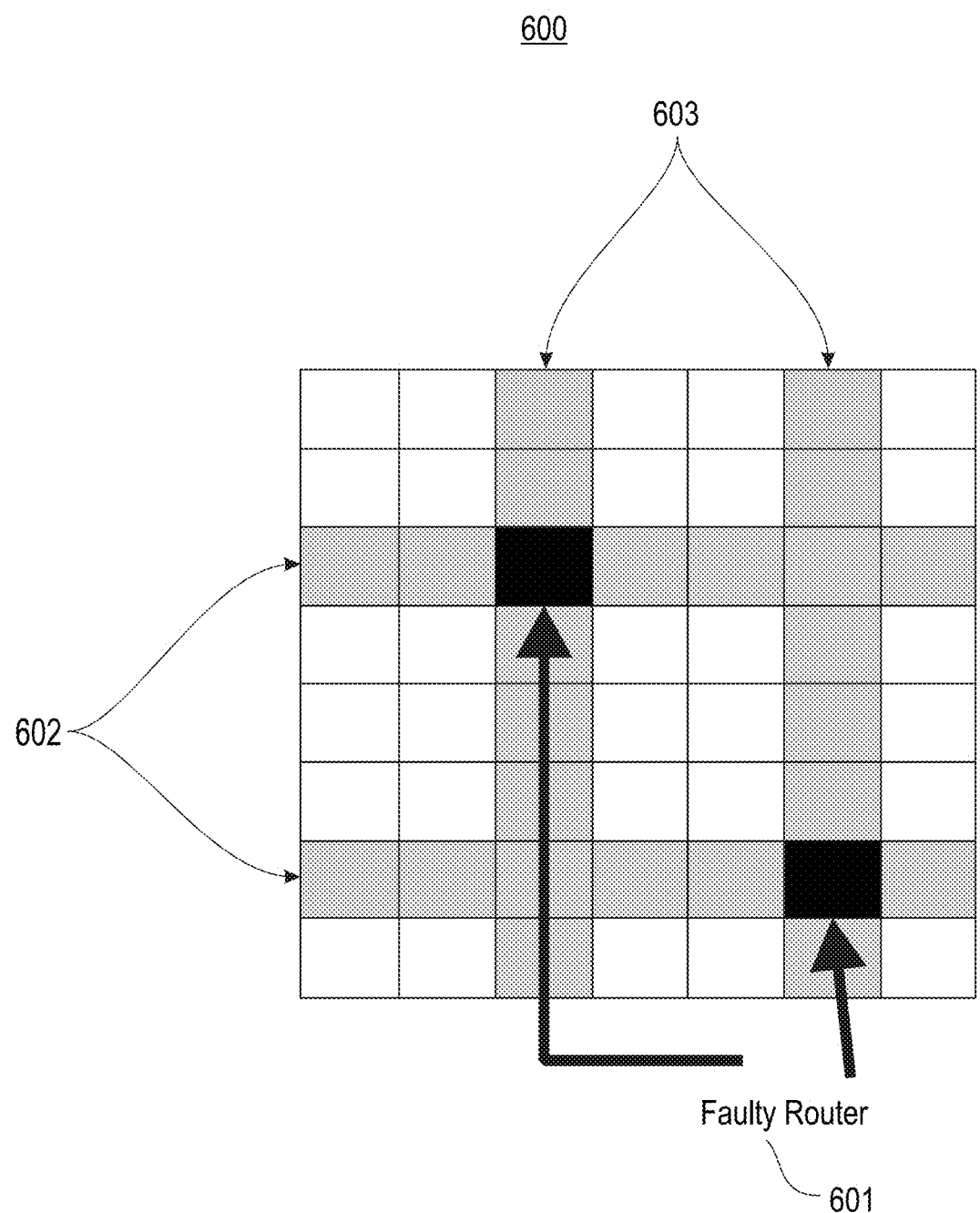
FIGS. 6A-C depict additional exemplary placements of neurosynaptic cores around faulty routers according to embodiments of the present disclosure.
Figure 6C:
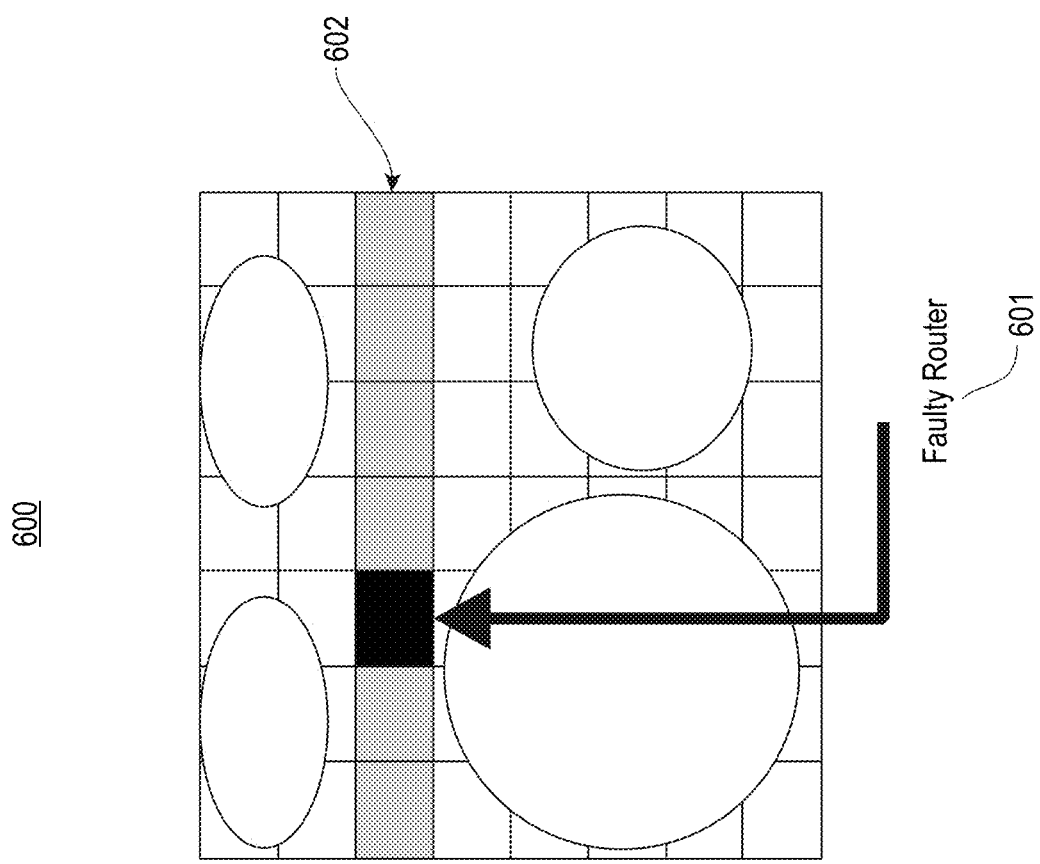
Figure 6B:
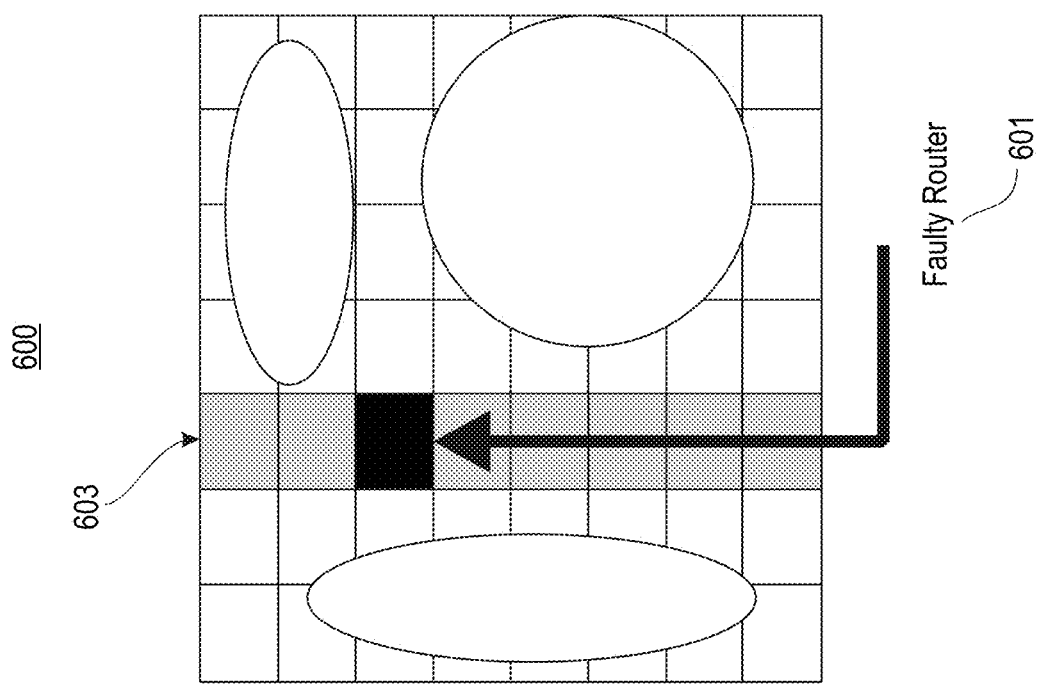

Referring to FIGS. 6A-C, exemplary placements are depicted according to the above approach. Grid 600 includes faulty routers 601. In FIG. 6A, the whole rows 602 and columns 603 from the faulty router location index are modeled as placement blockages. No logic cores will be assigned on rows 602 and columns 603, and any spike package through the router is prevented. In certain cases, this may results in the bypass of good cores. In FIG. 6B, only column 603 is modeled as a placement blockage, resulting in the bypass of fewer cores than in FIG. 6A. In FIG. 6C, only row 602 is modeled as a placement blockage, similarly resulting in the bypass of fewer cores than in FIG. 6A.

In some embodiments, the placement methodologies described herein are used to provide a fault tolerant placement given a minimum number of chips. In such embodiments, a number of logic cores is provided along with a specification of faulty locations. A minimum number of chips is calculated given the chip capacity and the number of cores. A placement is computed given the faulty locations as described above. If the placement is unsuccessful, then the number of chips is incremented and the placement is repeated.

According to various embodiments of the present disclosure, methods and systems to map the power minimization of spike communication cost problem to the wire-length minimization problem in VLSI Placement are provided. Thereby, a given latency constraint is met.

In some embodiments, a method to minimize the maximum latency as the maximum wirelength between every two gates in the placement graph is provided. Given the length constraints, for any paths that violates the length constraints, the net weight is increased artificially. In some embodiments, the increase in net weight is equivalent to an increase in the spike frequency. The placement is incrementally run to minimize the new weighted wirelength. The result is that gates are replaced to meet the latency constraints. In some embodiments, the latency is modeled as a cost function as well for the extension.

An exemplary linear programming-based formulation with a maximum length constraint includes minimizing the overall length without creating an overlap among and core pair. More particularly, $\Sigma_{net_i}$ Length(i) is minimized such that Length(i)<MAX_LENGTH for all i and such that there is no overlap among any core pair (thus imposing a placement legality constraint).

Figure 7B:
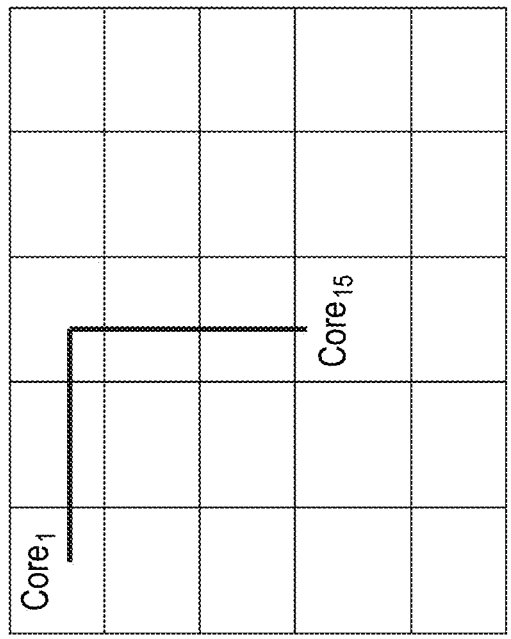
FIGS. 7A-B depict exemplary core placements and latencies according to embodiments of the present disclosure.
Figure 7A:
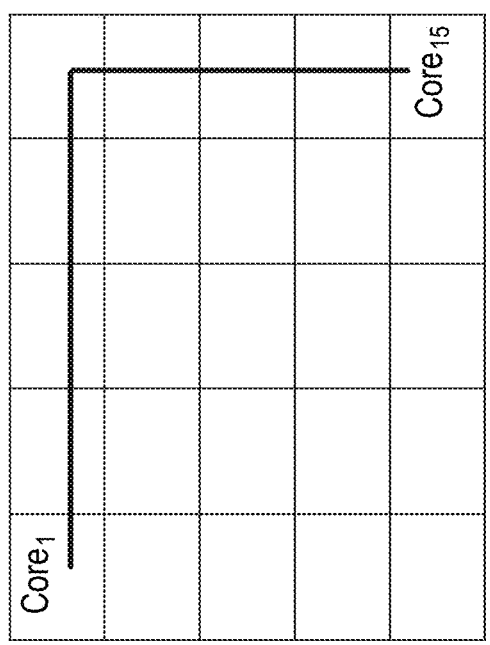
Figure 8A:
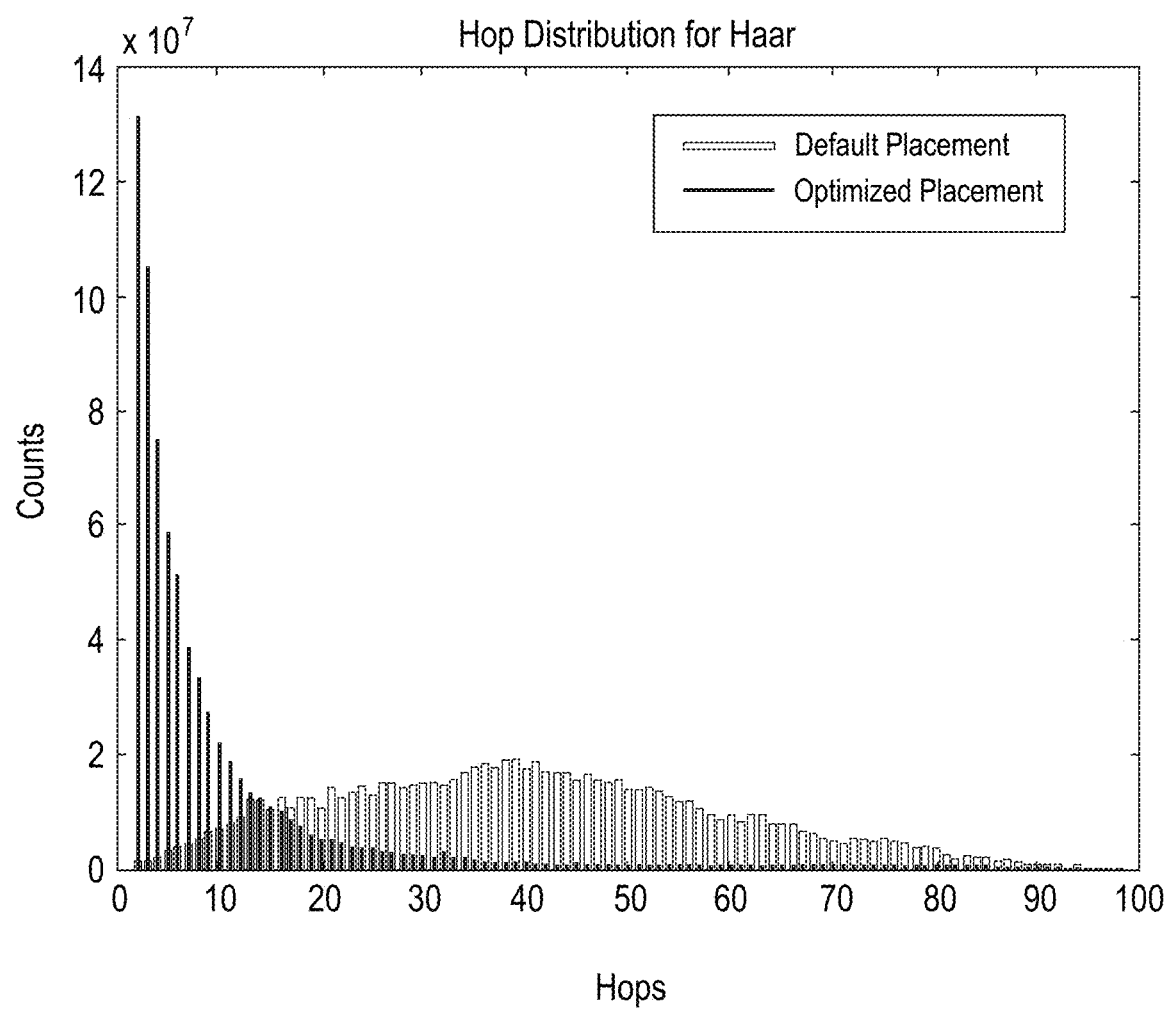
FIGS. 8A-E depict optimized hop counts according to embodiments of the present disclosure.
Figure 8B:
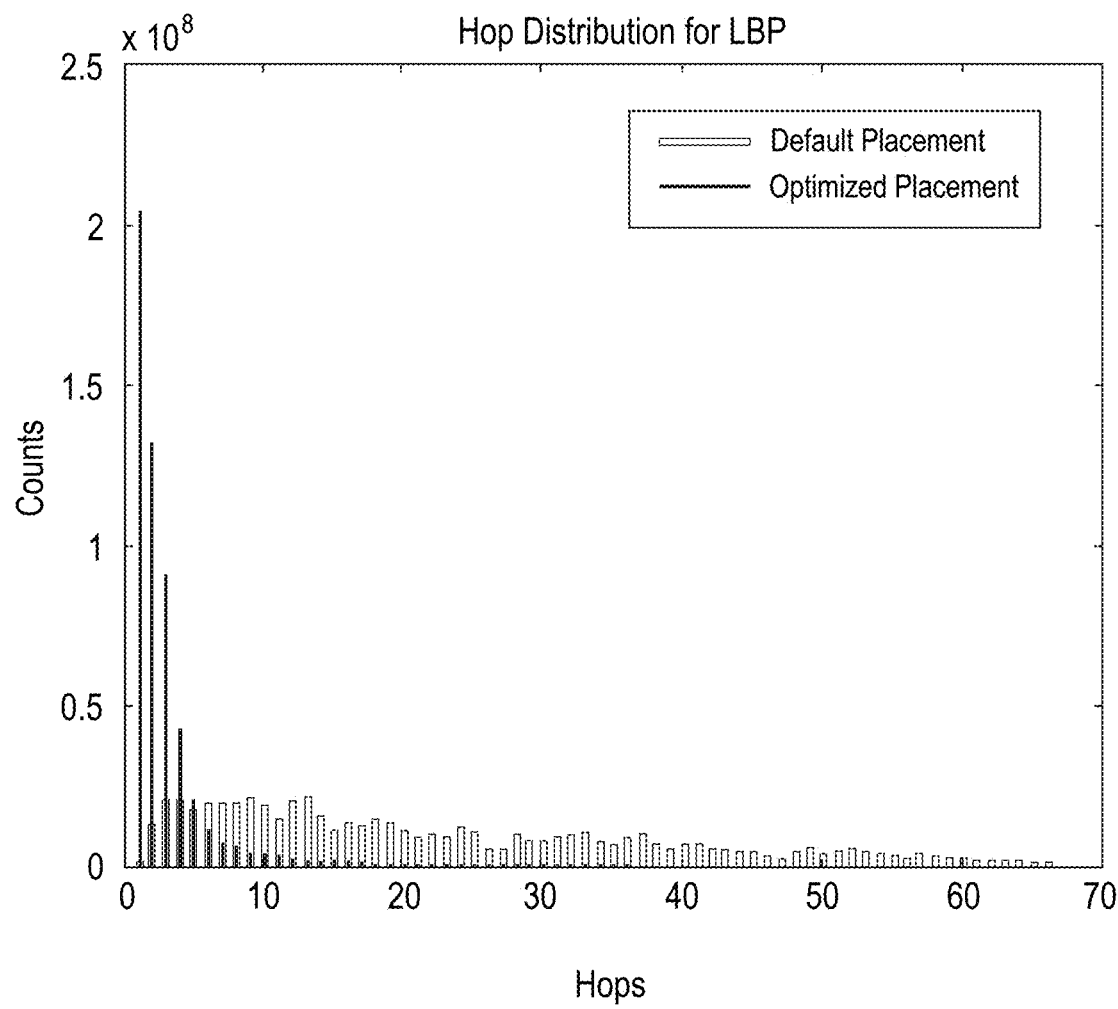
Figure 8C:
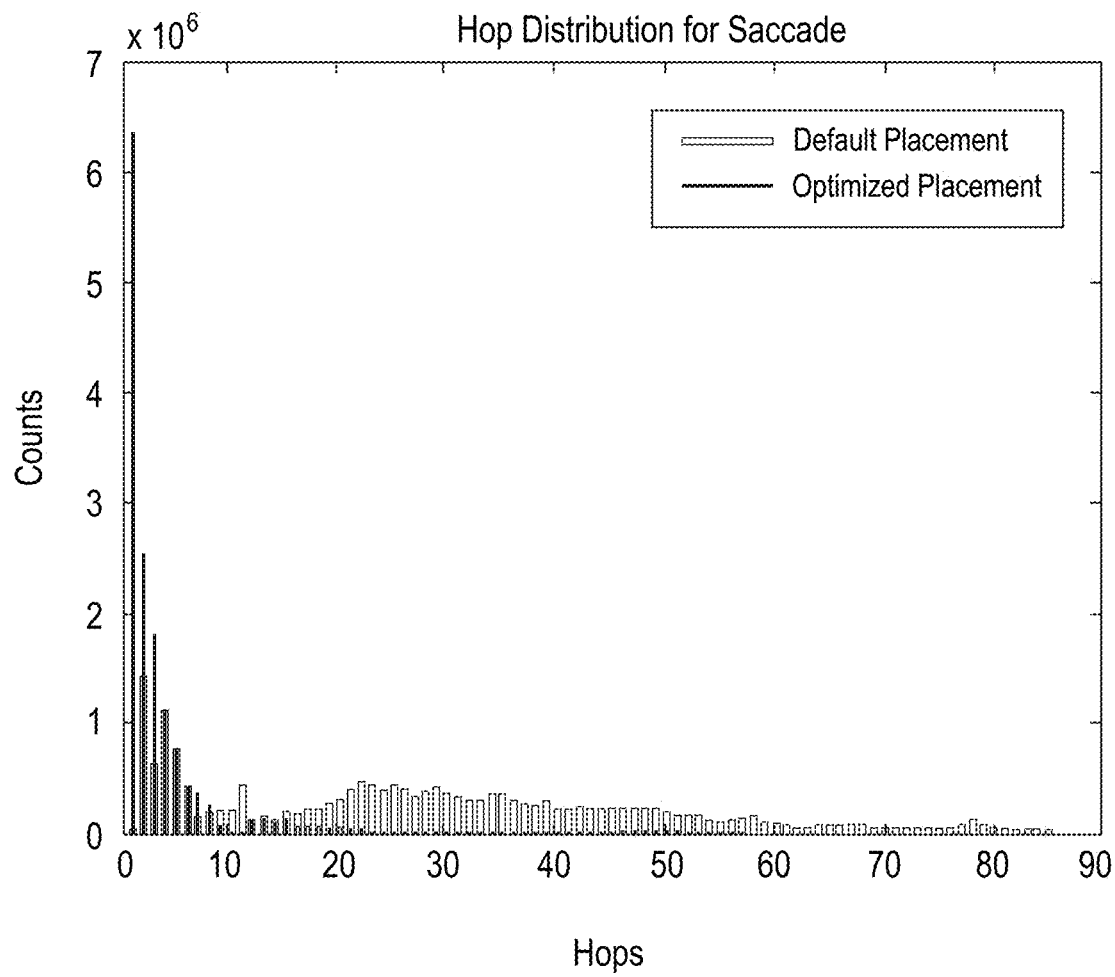
Figure 8D:
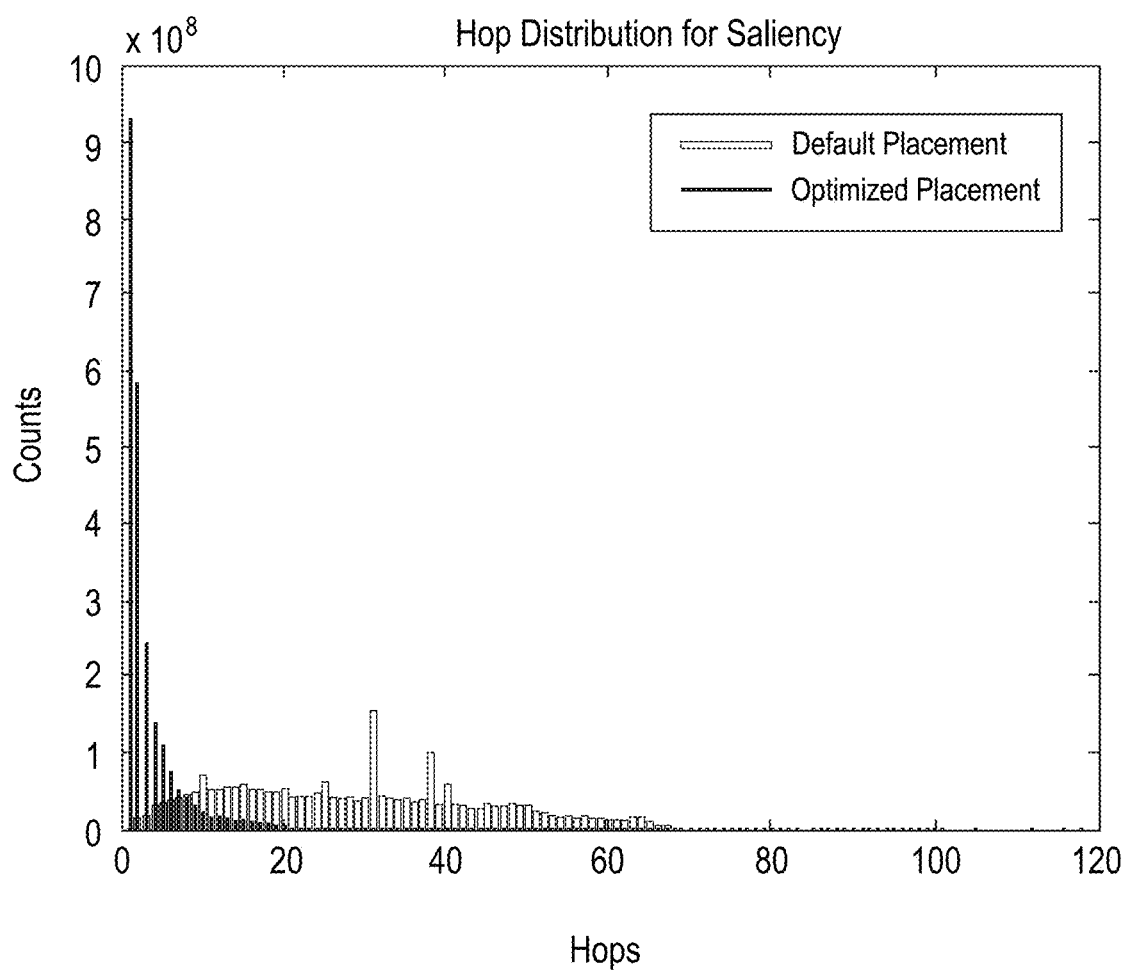
Figure 8E:
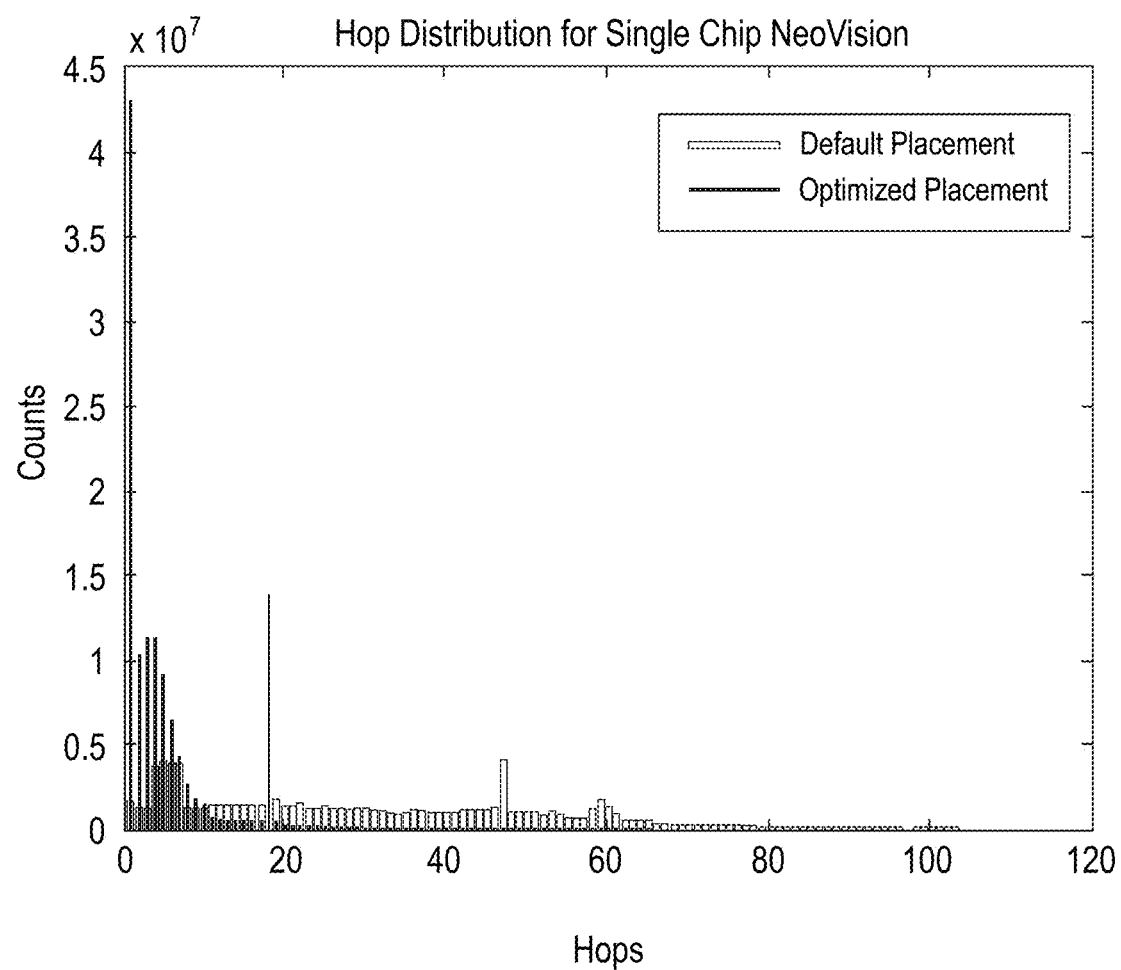

Referring now to FIGS. 7A-B, exemplary placements according to the present disclosure are provided. In FIG. 7A, there are eight hops between Core' and Core's. Given a latency constraint of six hops, the placement is incrementally optimized. In particular, the weights of the nets that violate length constraints are increased. The placement is then updated according to the approaches described above. As a result, the wire length may increase slightly, but the latency constrain is met after incremental updates. The resulting placement is depicted in FIG. 7B, in which the separation of Core' and Core's has decreased to five hops.

The active power required to route a spike between two cores is a function of the Manhattan distance between the grid locations of the two cores. The power becomes much higher if a spike traverses the chip boundaries and flows between different chips. According to the systems and methods of the present disclosure, placement optimization minimizes the overall active power of the system. In various embodiments, this minimization includes the spike bandwidth between multiple chips.

Exemplary test results are depicted below in Table 2. In this table, the CPLACE solution for various use cases is compared to the default solution with actual spiking inputs. This table summarizes the optimization in power for a 1, 2, and 4 chip NeoVision Tower System when evaluated using Compass (C3). In one exemplary embodiment, these solutions execute on a 4×1 board. In another exemplary embodiment, these solutions execute on a 2-4×1 slice board. In yet another exemplary embodiment, the cores are laid out on a 4×4 board (a 16 chips NeoVision Tower System).

TABLE 2

| Circuits | # Chips/ # Cores | # Nets | # Pins | Active Power Default | CPLACE |
|---|---|---|---|---|---|
| 1 chip neoVision | 1/4011 | 65783 | 131566 | 1.317 mW | 0.626 mW (52.46%) |
| 2 chip neoVision | 2/7815 | 138822 | 277644 | 4.613 mW | 1.467 mW (68.19%) |
| 4 chip neoVision | 4/15538 | 280979 | 561958 | 16.791 mW | 3.053 mW (82%) |

Further exemplary test results are depicted below in Table 3. In this table, the CPLACE solutions for various application networks are summarized using Compass (C3).

TABLE 3

| Circuits | # Chips/ # Cores | # Nets | # Pins | Active Power Default | CPLACE |
|---|---|---|---|---|---|
| Haar | 1/3875 | 45822 | 91644 | 11.835 mW | 2.824 mW (76.14%) |
| LBP | 1/3520 | 22032 | 44064 | 6.897 mW | 3.64 mW (47.22%) |
| Saccade | 1/2297 | 17523 | 35046 | 0.624 mW | 0.172 mW (72.44%) |
| Saliency | 1/3768 | 35408 | 70816 | 12.478 mW | 2.633 mW (78.9%) |
| neoVision | 1/4006 | 62093 | 124186 | 1.331 mW | 0.578 mW (56.57%) |

Referring now to FIGS. 8A-E, the hop distribution for each network of Table 3 is shown. It will be apparent from these graphs that the optimized placements using CPLACE provide a substantially reduced number of hops in comparison to the default placement.

Further exemplary test results are depicted below in Table 4. In this table, the CPLACE solutions for various application networks are summarized using Compass (C3).

TABLE 4

| Circuits | # Chips/ # Cores | # Nets | # Pins | Active Power Default | CPLACE |
|---|---|---|---|---|---|
| SCS | 1/984 | 3808 | 7616 | 163.50 mW | 94.83 mW (58.0%) |
| OF | 1/1580 | 5376 | 10752 | 100.2240 mW | 17.28 mW (82.7%) |
| EC | 2/7801 | 24960 | 49920 | 218.63 mW | 157.26 mW (30%) |
| kMeans | 4/14832 | 445380 | 890760 | 20.032 mW | 6.442 mW (67.8%) |
| Saliency | 4/14293 | 143301 | 286602 | 105.603 mW | 60.104 mW (43.08%) |
| neoVizGrid | 13/50894 | 508323 | 1016650 | 28.921 mW | 20.218 mW (30%) |

Figure 9:
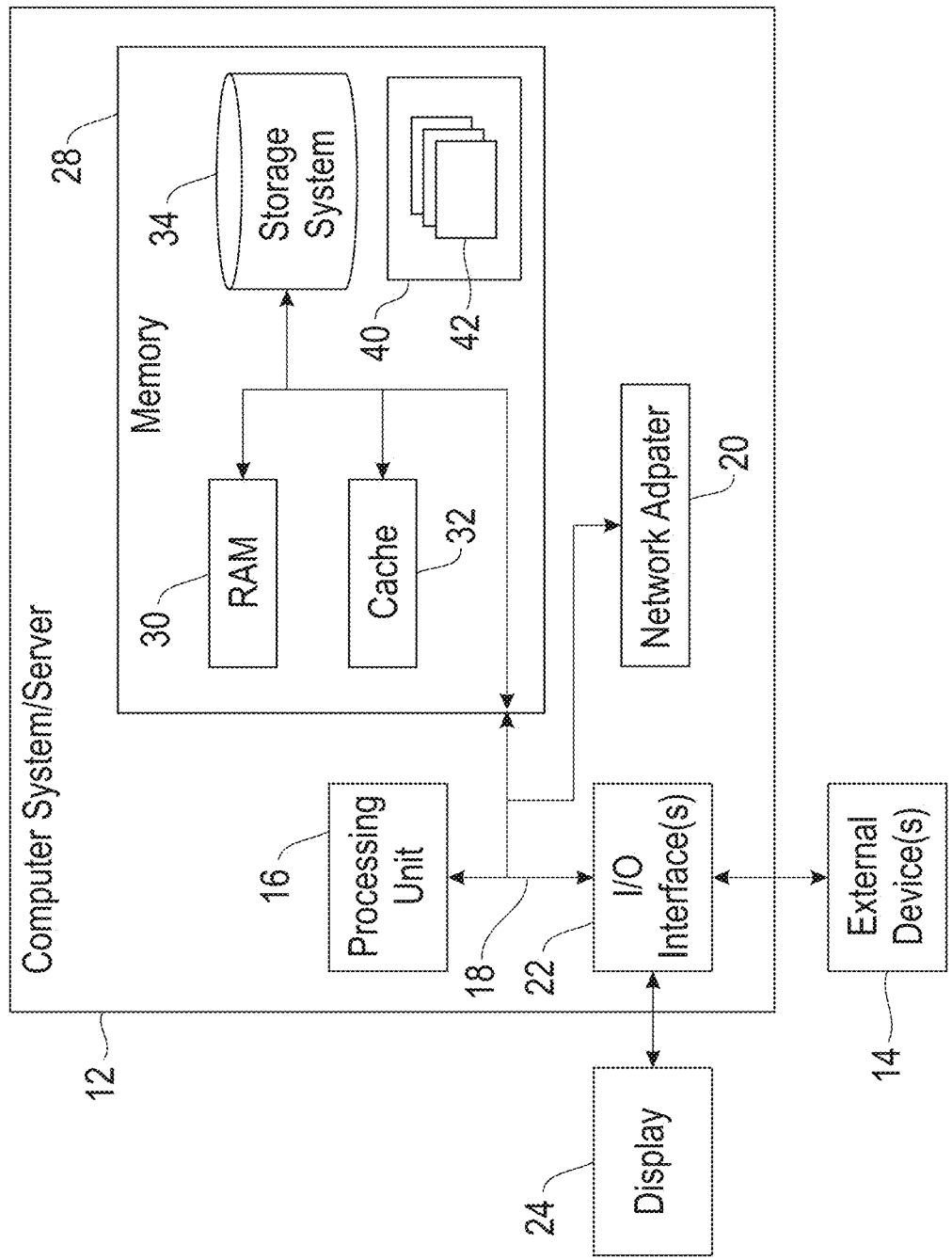
FIG. 9 depicts a computing node according to an embodiment of the present invention.

Referring now to FIG. 9, a schematic of an example of a computing node is shown. Computing node 10 is only one example of a suitable computing node and is not intended to suggest any limitation as to the scope of use or functionality of embodiments of the invention described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:
1. A method comprising:
   modeling power consumption of a neurosynaptic network as weighted wire length within a model, the neurosynaptic network comprising a plurality of physical neurosynaptic cores connected by a plurality of routers, said modeling comprising
   weighting the wire length by spike frequency among the plurality of physical neurosynaptic cores, the weighted wire length being proportional to a sum of a number of intra-chip hops that each spike travels and an inter-chip hop length;
   locating at least one faulty core of the plurality of physical neurosynaptic cores;
   modeling a placement blockage at the location of the at least one faulty core;
   determining a placement of the plurality of physical neurosynaptic cores by minimizing the weighted wire length, thereby minimizing power consumption of the spike communication while avoiding the faulty core; and providing the determined placement to configure the physical neurosynaptic cores for executing the plurality of logical cores.

2. The method of claim 1, wherein the minimizing the weighted wire length comprises applying a VLSI placement algorithm.

3. The method of claim 2, wherein the VLSI placement algorithm comprises partitioning-based placement.

4. The method of claim 1, further comprising:
locating at least one faulty router of the plurality of routers; and
modeling a second placement blockage, the second placement blockage including at least a core of the plurality of cores associated with the faulty router.

5. The method of claim 1, wherein the plurality of neurosynaptic cores is divided among a plurality of chips.

6. A method comprising:
modeling power consumption of a neurosynaptic network as weighted wire length within a model, the neurosynaptic network comprising a plurality of physical neurosynaptic cores connected by a plurality of routers, said modeling comprising
weighting the wire length by spike frequency among the plurality of physical neurosynaptic cores, the weighted wire length being proportional to a sum of a number of intra-chip hops that each spike travels and an inter-chip hop length;
locating at least one faulty router of the plurality of routers;
modeling a placement blockage, the placement blocking including at least a core of the plurality of cores associated with the faulty router;
determining a placement of the plurality of physical neurosynaptic cores by minimizing the weighted wire length, thereby minimizing power consumption of the spike communication while avoiding the faulty router; and
providing the determined placement to configure the physical neurosynaptic cores for executing the plurality of logical cores.

7. The method of claim 6, wherein:
the placement of the neurosynaptic cores is substantially along rows and columns of a grid;
the placement blockage includes at least a column of the grid.

8. The method of claim 6, wherein:
the placement of the neurosynaptic cores is substantially along a grid;
the placement blockage includes at least a row of the grid.

9. The method of claim 6, wherein:
the placement of the neurosynaptic cores is substantially along a grid;
the placement blockage includes at least a row and a column of the grid.

10. The method of claim 6, wherein the minimizing the weighted wire length comprises applying a VLSI placement algorithm.

11. The method of claim 10, wherein the VLSI placement algorithm comprises partitioning-based placement.

12. The method of claim 6, wherein the plurality of neurosynaptic cores is divided among a plurality of chips.

13. The method of claim 6, further comprising:
locating at least one faulty core of the plurality of neurosynaptic cores; and
modeling a second placement blockage at the location of the at least one faulty core.

14. A computer program product for fault-tolerant power-driven synthesis, the computer program product comprising a computer readable storage medium having program instructions embodied therewith, the program instructions executable by a processor to cause the processor to perform a method comprising:
modeling power consumption of a neurosynaptic network as weighted wire length within a model, the neurosynaptic network comprising a plurality of physical neurosynaptic cores connected by a plurality of routers, said modeling comprising
weighting the wire length by spike frequency among the plurality of physical neurosynaptic cores, the weighted wire length being proportional to a sum of a number of intra-chip hops that each spike travels and an inter-chip hop length;
locating at least one faulty core of the plurality of physical neurosynaptic cores;
modeling a placement blockage at the location of the at least one faulty core;
determining a placement of the plurality of physical neurosynaptic cores by minimizing the weighted wire length, thereby minimizing power consumption of the spike communication while avoiding the faulty core; and
providing the determined placement to configure the physical neurosynaptic cores for executing the plurality of logical cores.

15. The computer program product of claim 14, wherein minimizing the weighted wire length comprises applying a VLSI placement algorithm.

16. The computer program product of claim 15, wherein the VLSI placement algorithm comprises partitioning-based placement.

17. The computer program product of claim 14, the method further comprising:
locating at least one faulty router of the plurality of routers; and
modeling a second placement blockage, the second placement blockage including at least a core of the plurality of cores associated with the faulty router.

18. The computer program product of claim 14, wherein the plurality of neurosynaptic cores is divided among a plurality of chips.

* * * * *